United States Patent Office 3,317,304
Patented May 2, 1967

3,317,304
HERBICIDAL 2-HALOBENZIMIDAZOLES
Harry Goldsmith and Robert F. Crawford, La Mirada, Calif., assignors to United States Borax & Chemical Corporation, Los Angeles, Calif., a corporation of Nevada
No Drawing. Filed Feb. 12, 1964, Ser. No. 344,220
15 Claims. (Cl. 71—2.5)

This invention relates to 2-halobenzimidazoles, and more particularly, to compositions and methods of utilizing 2-halobenzimidazoles as herbicides.

Benzimidazoles are heterocyclic compounds based on the structure

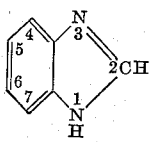

Those benzimidazoles possessing a free imino hydrogen (in the 1-position) are tautomeric systems and the derivatives not possessing a plane of symmetry can exist in two possible tautomeric forms. Thus, the 4 or 5-substituted benzimidazoles can also exist in the 7- or 6-substituted forms, respectively. Therefore, whenever a mono- or polysubstituted benzimidazole not possessing a plane of symmetry is named, it is usually referred to using both positions, as, for example, 5(6)-chlorobenzimidazole or 4(7)-chlorobenzimidazole. This system of nomenclature is followed in the following description and claims.

According to the present invention, there are provided novel herbicidal compositions and methods utilizing compounds of the formula

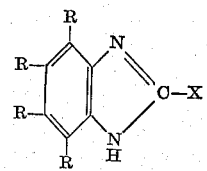

where R is selected from the group consisting of hydrogen, lower alkyl, chlorine and bromine, and X is a halogen atom selected from bromine and chlorine. Thus, the aromatic ring can be unsubstituted or can have from one to four substituents selected from lower alkyl, chloro or bromo groups or combinations thereof. Examples of suitable lower alkyl groups include methyl, ethyl, n-propyl, isopropyl, n-butyl, sec.-butyl, n-pentyl, n-hexyl and the like. The preferred compounds are those having one lower alkyl, bromo or chloro substituent in the 5(6)-position of the compound.

The 2-halobenzimidazoles of the present invention are normally crystalline solids which are soluble in the usual organic solvents, such as alcohols, ethers and hydrocarbons, and insoluble in water. They are readily prepared by reaction of the corresponding benzimidazolone with a halogenating agent such as phosphorus oxychloride, phosphorus oxybromide, phosphorus pentachloride, and the like. Preferably, when using an oxyhalide, an excess of the halogenating agent is employed and can be used in lieu of a solvent for the reaction medium. When a solid halogenating agent such as phosphorus pentachloride is used, an inert solvent such as the inert hydrocarbons is desirably employed to maintain control of the reaction temperature and facilitate mixing. The reaction takes place at elevated temperatures such as in the range of about 80° to 120° C. to give the desired 2-halobenzimidazole in a relatively short period of time. Most of the excess halogenating agent can be removed by distillation under reduced pressure and the residue then hydrolyzed, such as with aqueous hydrochloric acid. The aqueous mixture can be neutralized, such as with ammonium hydroxide, and the crude insoluble product removed by filtration. The crystalline product can be purified by conventional procedures such as recrystallization from alcohol.

The following examples are presented to illustrate the preparation of representative compounds of this invention, but it is to be understood that the invention is not to be limited to the specific examples given.

EXAMPLE I

*2-chlorobenzimidazole*

A mixture of benzimidazolone (15.0 g.; 0.112 mole) and phosphorus oxychloride (150 ml.; 1.64 mole) was heated at reflux temperature for four hours. Gaseous hydrogen chloride was bubbled through the solution during this time. The excess phosphorus oxychloride was removed by distillation under reduced pressure and cold water was added slowly to the residue. The acid-insoluble solid was removed by filtration and washed with 25% hydrochloric acid. The combined filtrate and wash solution was basified with ammonium hydroxide, precipitating the crude crystalline product which was removed by filtration. Recrystallization from ethanol gave 2-chlorobenzimidazole, M.P. 178°–178.5° C. (resolidified).

EXAMPLE II

*2-chloro-5(6)-methylbenzimidazole*

A mixture of 5-methylbenzimidazolone (8.9 g.; 0.06 mole) and 150 ml. (1.64 mole) of phosphorus oxychloride was heated at 110° C. for 1.5 hours. Gaseous hydrogen chloride was then bubbled through the resulting solution for 3.5 hours at 110° C. Excess phosphorus oxychloride was removed by vacuum distillation, and 250 ml. of an ice-water mixture was added to the residue. The insoluble material was removed by filtration. The filtrate was basified (pH 8) with ammonium hydroxide and cooled to precipitate the crude product. After isolating by filtration, the crude product was recrystallized from ethanol-water to give 2-chloro-5(6)-methylbenzimidazole, M.P. 163°–165° C.

EXAMPLE III

*2,5(6)-dichlorobenzimidazole*

A mixture of 5.0 g. of 5-chlorobenzimidazolone and 16.2 ml. of freshly distilled phosphorus oxychloride was sealed in a Pyrex tube and heated at 160°–170° C. for 3 hours. The resulting crude reaction mixture was triturated thoroughly with 2 HCl and the resulting slurry then filtered. The filtrate was brought to pH 7 with concentrated ammonium hydroxide. The white precipitate was removed by filtration and air dried to give the crude product, M.P. 199°–200° C. Recrystallization from aqueous ethanol gave 2.5 g. of 2,5(6)-dichlorobenzimidazole, M.P. 205°–206° C.

Other compounds embraced by the present invention which can be prepared according to the above-described procedure comprise 2-bromo-5-(6)-ethylbenzimidazole, 2-bromo-5-(6)-butylbenzimidazole, 2-chloro-4(7) - methylbenzimidazole, 2,5(6)-dibromobenzimidazole, and 2,4(7)-dichloro-5(6)-methylbenzimidazole.

The 2-halobenzimidazoles of this invention are effective herbicidal compounds useful for controlling weed growth. "Weeds" as used herein is intended to include any plant growth which is undesirable. The compounds are useful as a pre-emergence or a post-emergence treatment, that is, they can be used to kill growing plants or they can be used to kill or prevent the emergence of seedlings of the plant. Thus, the compounds can be used to control the growth of weeds by applying a phytotoxic amount to the locus of the weeds, that is, to the foliage of the growing weeds or to soil in which the weeds are growing or will grow.

An application rate in the range of from about 1 to 40 pounds of one or more of the active compounds per acre is generally an effective phytotoxic amount, although greater or lesser amounts can be used if desired. The presently preferred application rate is in the range from about 2 to about 20 pounds per acre. At lower application rates, such as from about 1 pound to about 12 pounds per acre, the compounds are useful as selective herbicides for killing weeds in the presence of desirable crops. For example, at the lower rates of application, 2-chloro-5-methylbenzimidazole can be used as a selective herbicide for controlling weed growth in crops such as corn, soybeans, sorghum and peas. Many of the other compounds can also be used as selective herbicides at the lower rates of application, although the response of the specific weeds will vary somewhat depending upon the specific chemical employed and the rate of application, as well as the crop in which the weeds are growing.

The following examples are presented to illustrate the herbicidal activity of representative compounds of this invention.

EXAMPLE IV 2-chlorobenzimidazole was applied as a methanol solution at a rate of 11 pounds of the compound per acre to peas, mustard, cucumbers and bean plants. Twenty-five days after application as a pre-emergence and post-emergence treatment, the plants were rated on a 0-to-10 basis, with 0 meaning no effect and 10 meaning complete kill. The following results were obtained.

| Test Plant | Activity Rating | |
|---|---|---|
| | Pre-emergence | Post-emergence |
| Peas | 4 | 2 |
| Mustard | 10 | 10 |
| Cucumbers | 10 | 10 |
| Snap beans | 10 | 5 |

As can be seen, the peas exhibited very little effect from the chemical, especially when treated post-emergence.

EXAMPLE V 2,5(6)-dichlorobenzimidazole was applied as a methanol solution to peas, mustard, cucumbers, beans, millet, and ryegrass at a rate of 10 pounds per acre as a pre-emergence and post-emergence treatment. Twenty-four days after application, a complete kill of millet, ryegrass, mustard, cucumbers and bean plants was obtained as a result of both the pre-emergence and post-emergence treatments. The peas exhibited no effect from the pre-emergence treatment and a slight injury from the post-emergence treatment.

EXAMPLE VI 2-chloro-5(6)-methylbenzimidazole was applied as a methanol solution at a rate of 7 pounds per acre as a pre-emergence treatment to ryegrass, oats, millet, mustard, cucumbers and beans. Twenty-seven days after application a complete kill of all plants was recorded. A similar result was obtained by application as a post-emergence treatment at the same rate.

EXAMPLE VII 2-chloro-5(6)-methylbenzimidazole was applied as an aqueous solution of its hydrochloride salt as a pre-emergence treatment to oats, wild oats, Johnson grass, crab grass, ryegrass, mustard, corn, sorghum and soybeans. At an application rate of 8 pounds per acre, all plants were killed except for the corn, sorghum and soybeans, which were uninjured. Sixty days after application of the compound to the soil the herbicidal action had diminished to near zero. This illustrates the extremely short duration of the active compound in the soil, which is highly desirable for certain selective uses in crop land.

When the compound was applied at the same rate as a post-emergence treatment, mustard and crab grass were killed without injury to corn, sorghum and soybeans. Thus, it is apparent that the compound is particularly useful for the control of weeds in crops such as corn, sorghum and soybeans.

Since a relatively small amount of one or more of the active 2-halobenzimidazoles should be uniformly distributed over the area to be treated, the compounds preferably are formulated with conventional herbicidal carriers, either liquid or solid. Thus, the compounds can be impregnated on or admixed with a solid carrier such as lime, talc, clay, bentonite, calcium chloride, vermiculite, calcium carbonate, and the like. Alternatively, the compounds can be dissolved or suspended in a liquid carrier such as water, kerosene, alcohols, Diesel oil, xylene, benzene, glycols and the like. A surfactant preferably is included to aid in dispersion, emulsification and coverage. The surfactant can be ionic or nonionic, and may be liquid or a solid. The use of the term "surfactant" herein is intended to include such compounds commonly referred to as wetting agents, dispersing agents and emulsifying agents. Typical surfactants include the alkylarylsulfonates, the fatty alcohol sulfates, sodium salt of naphthalenesulfonic acid, alkylaryl polyether alcohols, long chain quaternary ammonium compounds, sodium salts of petroleum-derived alkylsulfonic acids, polyoxyethylene sorbitan monolaurate, and the like. These dispersing and wetting agents are sold under numerous trademarks and may either be pure compounds, mixtures of compounds of the same general group, or they may be mixtures of compounds of different classes. Surfactants can also be included in compositions containing a solid inert carrier.

Concentrated compositions containing the active herbicidal agent which can be subsequently diluted, as with water, to the desired concentration for application to plants and soil are also provided. The advantages of such concentrates are that they are prepared by the manufacturer in a form such that the user need only mix them with a locally available carrier, preferably water, thereby keeping shipping costs to a minimum while providing a product which can be used with a minimum of equipment and effort. Such concentrates may contain from about 5 to about 99 percent by weight of one or more of the active 2-halobenzimidazoles with a carrier or diluent, which may be a solid or liquid. Liquid carriers which are miscible with the active agent or other liquids in which the compound may be suspended or dispersed may be used. A surfactant is also generally included to facilitate such dilution or dispersion in water. However, the surfactant itself may comprise the carrier in such concentrates.

Since the compounds will form salts with strong acids, such as hydrochloric acid, they can be readily formulated as the salt of the compound in an aqueous solution. This provides a facile method of formulating the compounds since the salts are water-soluble and is preferred for many applications.

The herbicidal compositions can include other beneficial adjuvants, such as humectants, oils and contact agents. Also, other herbicides, such as sodium chlorate and the sodium borates, 2,3,6-trichlorobenzyloxypropanol, the chlorophenoxyacetic acids, trichlorobenzoic acids, substituted ureas, triazines, uracils and carbamates, can be included in the formulations.

The following examples are presented to illustrate preparation of suitable herbicidal compositions of the present invention.

EXAMPLE VIII

| | Percent |
|---|---|
| Granular clay | 92 |
| 2,5(6)-dichlorobenzimidazole | 4 |
| Diesel oil | 4 |

The powdered benzimidazole is mixed uniformly on the granular clay by tumbling in a rotary mixer. Diesel oil is sprayed onto the mixture, adhering the compound to the clay. The resulting granular formulation can be applied by hand or by mechanical spreader to the soil or plants.

EXAMPLE IX

| | Percent |
|---|---|
| 2-chloro-5(6)-methylbenzimidazole | 15 |
| Dodecyl ether of polyethylene glycol | 5 |
| Methanol | 40 |
| Isopropanol | 40 |

The above liquid formulation can be diluted with water to form an emulsion and the emulsion sprayed with conventional spray equipment on soil or plants.

EXAMPLE X

| | | |
|---|---|---|
| 2-chloro-5(6)-methylbenzimidazole | lb. | 0.2 |
| Alkylarylpolyoxyethylene glycols | lb. | .055 |
| Water with HCl to bring the formulation to pH 1, gal. | | 1 |

The above formulation can be sprayed with conventional spray equipment. At a level of 100 gal./A., the formulation will apply 20 lbs./A. of 2-chloro-5(6)-methylbenzimidazole to plants or to soil.

EXAMPLE XI

| | Percent |
|---|---|
| 2-chloro-5(6)-methylbenzimidazole | 8 |
| 3-(3,4-dichlorophenyl)-1-methyl-1-methoxyurea | 1 |
| Sodium lauryl sulfate | .5 |
| Diesel oil | 5 |
| Granular clay | 85.5 |

The powdered benzimidazole and urea are mixed uniformly on the granular clay by tumbling in a rotary mixer. Diesel oil is sprayed onto the mixture, adhering the compound to the clay. The resulting granular formulation can be applied by hand or by mechanical spreader to the soil or plants.

EXAMPLE XII

| | Percent |
|---|---|
| 2,5(6)-dichlorobenzidmidazole | 80 |
| Bentonite clay | 19 |
| Sodium lauryl sulfate | 1 |

A wettable powder formulation can be prepared by micronizing the benzimidazole and mixing uniformly with powdered bentonite clay and powdered sodium lauryl sulfate. The wettable powder can be added to water or hydrocarbon oil and mechanically agitated to insure a uniform dispersion which can be sprayed with conventional equipment on soil or vegetation.

Other modes of applying the principle of the invention may be employed, change being made as regards the details described, provided the features stated in any of the following claims or the equivalent of such be employed.

We, therefore, particularly point out and distinctly claim as our invention:

1. The method of controlling undesirable weed growth which comprises applying to the locus of said weeds a phytotoxic amount of a compound of the formula

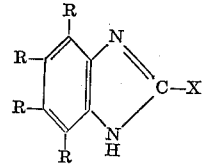

where each R is selected from the group consisting of hydrogen, chlorine and bromine and X is a halogen atom selected from bromine and chlorine.

2. The method according to claim 1 in which said compound is applied at a rate of from about 2 to about 20 pounds per acre.

3. The method according to claim 1 in which said compound is applied as a hydrochloride salt.

4. The method of controlling weed growth which comprises applying a phytotoxic amount of 2-chlorobenzimidazole to the locus of said weeds.

5. The method of controlling weed growth which comprises applying a phytotoxic amount of 2,5(6)-dichlorobenzimidazole to the locus of said weeds.

6. The method of selectively controlling undesirable weed growth in corn which comprises applying to the locus of said weeds from about 1 to about 12 pounds per acre of 2-chloro-5(6)-methylbenzimidazole.

7. The method of selectively controlling undesirable weed growth in soybeans which comprises applying to the locus of said weeds from about 1 to about 12 pounds per acre of 2-chloro-5(6)-methylbenzimidazole.

8. The method of selectively controlling undesirable weed growth in sorghum which comprises applying to the locus of said weeds from about 1 to about 12 pounds per acre of 2-chloro-5(6)-methylbenzimidazole.

9. A herbicidal composition comprising a phytotoxic amount of a compound of the formula

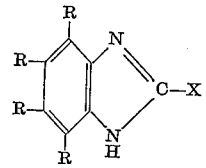

where each R is selected from the group consisting of hydrogen, lower alkyl, chlorine and bromine and X is a halogen atom selected from bromine and chlorine, a surfactant, and a solid carrier therefor, said solid carrier comprising the major portion of said composition.

10. A herbicidal composition according to claim 9 in which said compound is in the form of its hydrogen chloride salt.

11. A herbicidal composition comprising a phytotoxic amount of 2-chlorobenzimidazole, a surfactant, and a solid carrier therefor, said carrier comprising the major portion of said composition.

12. A herbicidal composition comprising a phytotoxic amount of 2-chloro-5(6)-methylbenzimidazole, a surfactant, and a solid carrier therefor, said carrier comprising the major portion of said composition.

13. A herbicidal composition comprising a phytotoxic amount of 2,5(6)-dichlorobenzimidazole, a surfactant and a solid carrier therefor, said carrier comprising the major portion of said composition.

14. In the method for selectively controlling undesirable weed growth in corn, sorghum and soybeans, the improvement which comprises applying to the locus of the weeds a phytotoxic amount of 2-halo-5(6)-lower alkylbenzimidazole in which said halo substituent is selected from bromine and chlorine.

15. The method according to claim 14 in which said 2-halo-5(6)-lower alkylbenzimidazole is in the form of its hydrogen chloride salt.

(References on following page)

References Cited by the Examiner

UNITED STATES PATENTS

| | | | |
|---|---|---|---|
| 3,112,192 | 11/1963 | Feichtmeir et al. | 71—2.5 |
| 3,182,070 | 4/1965 | Moyle | 71—2.5 |

FOREIGN PATENTS

| | | |
|---|---|---|
| 127,269 | 4/1959 | U.S.S.R. |

OTHER REFERENCES

Bednyagina et al.: Chemical Abstract, vol. 55, pp. 1586–1587 (1961).

Elderfield: Heterocyclic Compounds, volume 5, pages 271, 284 to 286.

Wang: Canadian Journal of Botany, vol. 39, pp. 1029 to 1036. (1961).

Klingensmith: Chemical Abstract, vol. 55: 7568 (1961).

Galston: Chemical Abstract, vol. 48: 5306 (1954).

LEWIS GOTTS, *Primary Examiner.*

JAMES O. THOMAS, Jr., A. J. ADAMCIK,
*Assistant Examiners.*